May 21, 1940.   T. W. WINBERG   2,201,752
VALVE FOR DISPENSING APPARATUS
Filed April 22, 1938
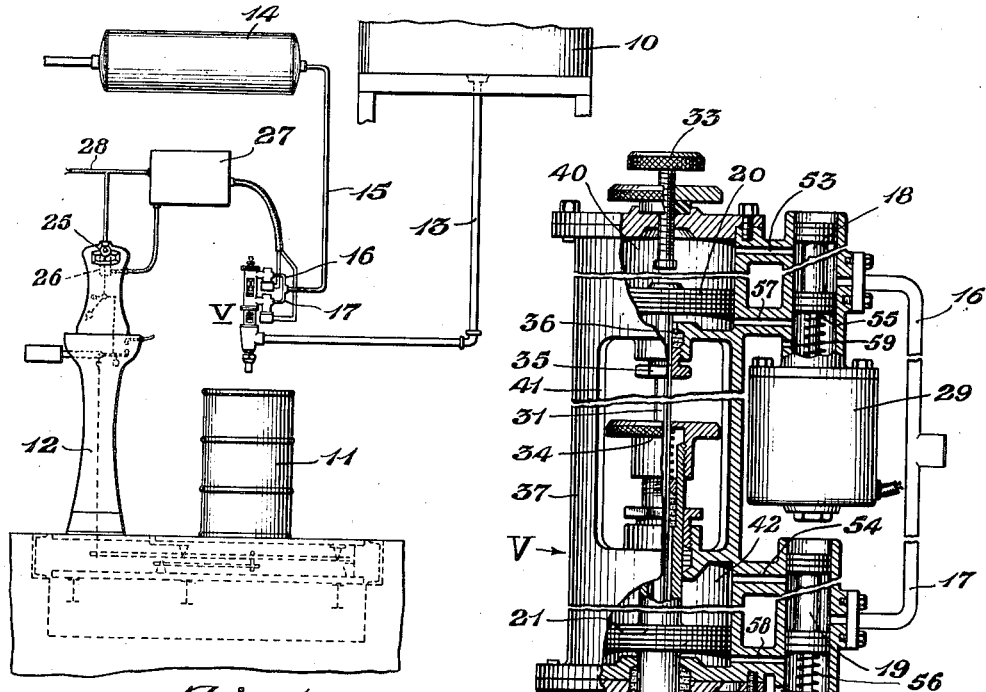
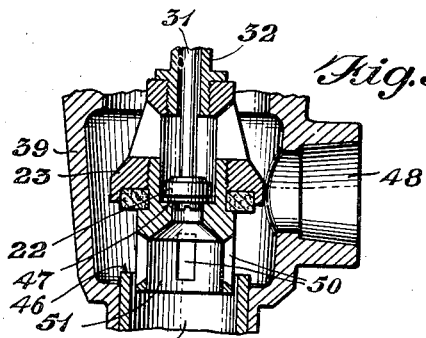
Fig. 3.
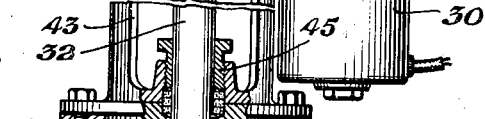
Fig. 2.
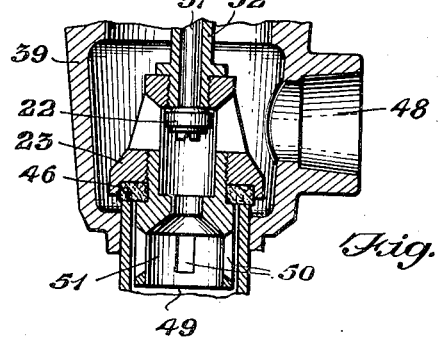
Fig. 4.
Inventor
Travis W. Winberg
Attorney Patented May 21, 1940

2,201,752

UNITED STATES PATENT OFFICE 2,201,752

VALVE FOR DISPENSING APPARATUS

Travis W. Winberg, Beaumont, Tex.

Application April 22, 1938, Serial No. 203,681

6 Claims. (Cl. 137—144)

This invention relates to valve apparatus, and more particularly to a valve system for accurately controlling the flow of fluids.

It has been found in practice that it is desirable, in the measuring of fluids passing through pipe lines, to have incorporated in such pipe lines a valve or valve system having the capacity to control the flow of fluids accurately. If the pipe line carrying the fluid is large the flow of fluid therethrough may be more or less accurately controlled by having a relatively small valve associated therewith through which the fluid flows relatively slowly. This arrangement while accurately metering the fluid flow is undesirable because of the great time that must necessarily elapse if any great measure of fluid is to be passed. A single large valve in the place of the relatively small valve just mentioned will take care of great quantities of fluid quickly but will be relatively inaccurate in its control of fluid because of inertia of the parts, the time necessary to effect complete closure of the valve from full open position being relatively great and for other obvious reasons.

It has further been proposed in the past that a system of valves could be utilized for more accurately controlling and measuring quantities of fluid passing through a pipe system comprising a large valve and a relatively small valve, the large valve being open for the great majority of the time until almost the desired quantity of fluid is passed, the large valve then being closed and the fluid passed through the relatively small valve until the precise quantity is passed when the said small valve is also closed. Such a system incorporates the advantage involving the saving of time and simultaneously retains the feature involving accuracy of control whereby a relatively large quantity of fluid may be passed through a pipe system and may be accurately measured in a relatively short time.

Prior to my improved valve arrangement, many crude forms of systems incorporating large and small valves have been suggested. They have generally been clumsy, awkward to control, difficult to adjust and though such prior systems were better than the single valve control they were not entirely satisfactory in that they were not sufficiently automatic, easy to operate or compact in form.

It is an object of my invention to provide a multiple valve structure capable of simple adjustment and ease of operation.

It is a further object of my invention to provide a multiple valve system compact in form and capable of rapid, accurate control of fluids.

Other objects and the nature and advantages of the invention will be apparent from the following description taken in conjunction with the accompanying drawing, wherein:

Fig. 1 is a schematic view, generally in elevation showing my improved valve structure in a system for weighing liquids;

Fig. 2 is a substantially full size showing, partly in elevation and partly in section of a preferred form of my novel valve structure;

Fig. 3 is a fragmentary sectional view of the valve structure showing both the large and small valve elements in raised position; and, Fig. 4 is a view similar to Fig. 3 with the small valve element in open position and the large valve element in closed position.

Referring to the drawing, a storage tank 10 is arranged to supply liquid in metered quantities to a series of containers 11, one of which is illustrated as resting upon Toledo scale 12. A discharge pipe 13 leading from tank 10 has at its discharge end my novel valve structure V shown more in detail in Fig. 2. A compressed air source depicted in Fig. 1 as the tank 14 is arranged to supply motive medium through the pipe 15 to the branch pipes 16 and 17, thence depending upon the position of controlling valves 18 and 19 to the operating pistons 20 and 21, which are directly connected to the small valve element 22 and the large valve element 23, respectively.

The compressed air tank 14 may be supplied with air at the proper pressure by any suitable source such as an intermittently operated air compressor, not shown, which is arranged to operate when the pressure within the tank 14 is below a predetermined pressure and which ceases operation when the pressure is at or slightly above a predetermined pressure. The valves 22 and 23 which control the discharge of liquid from the tank 10 to the container 11 are in turn indirectly controlled by the reading on the Toledo scale 12. This indirect control is effected through the medium of a conventional photo-electric cell not shown, but horizontally disposed with respect to a movable light source 25, which initiates a current when the source of light 25 is thrown upon it, which source of light is controlled by the position of the pointer 26 on the Toledo scale 12 or by the amount of weight registered thereon. This current initiated or generated from the photo-electric cell may be amplified by suitable relays within the amplifier 27, which receives current from the source 28. Solenoids, not shown, located within casings 29 and 30 receive current from the amplifier 27 and are arranged to control the valves 18 and 19, respectively, which determine whether or not air pressure may be applied to pistons 20 and 21, respectively, which are arranged to directly actuate valve elements 22 and 23, respectively. The piston 20 is directly connected to the valve element 22 through the medium of a long, narrow stem 31 and the piston 21 is directly connected to the relatively large valve element 23 through the medium of a tubular stem 32.

The amount of opening of the valve element 22 may be adjusted by turning thumb screw 33; turning in one direction permitting greater opening of the valve, and turning in the other direction diminishing the amount that the valve may open. Similarly, the thumb screw 34 adjustably controls the movement of the large valve element 23. The top portion of the thumb screw 34 is arranged to cooperate with the stop 35 in controlling the limit of movement of the valve stem 32 secured to valve element 23. Not only does the stop 35 perform the functions of limiting the movement of the valve element 23 but it serves as a holding means for the packing 36 about the stem 31 associated with piston 20 and small valve element 22.

The valve structure V is composed generally of three major sections 37, 38, and 39, respectively, which are bolted together to form a unitary construction. Section 37 comprises an upper air cylinder 40 in which the piston 20 operates under the influence of compressed air supplied by tank 14 and which is controlled by valve 18, as already described. In the center portion of the section 37 cut out parts 41 permit adjustment of the thumb screw 34 and further permit access to the packing about the movable stems 31 and 32. In the lower portion of the section 37 is located a cylinder 42 in which the piston 21 operates under the influence of compressed air passed from tank 14 through branch conduit 17 controlled by the valve 19. In the section 38 which is bolted to the lower portion of section 37, cut out portions 43 are formed which permit access to the packing glands 44 and 45 about the shaft 32. The section 39 is bolted to the lower portion of section 38 and contains the valve seat 46 with which large valve element 23 cooperates.

Within the valve element 23 and axially aligned therewith is the valve seat 47 with which the small valve element 22 is adapted to cooperate. Both the valve elements 22 and 23 are arranged to control the flow of liquid through the inlet 48 and from the outlet 49. When the valve element 23 is in raised position, fluid may flow from the inlet 48 through the openings 50 formed within the valve element 23 and out through the outlet 49. The openings 50 are formed within a tubular section 51 of the valve element 23, which tubular section slidably coacts with the tubular portion 52, axially aligned within the lower part of the section 39.

The solenoids within casings 29 and 30 are arranged to draw the valves 18 and 19, respectively, downwardly when said solenoids are energized as already described. With said valves 18 and 19 in their lower-most positions, their upper portions are below the passages 53 and 54, respectively, whereby air on the opposite side of the pistons 20 and 21, respectively, from that side against which compressed air is permitted to act, may be released. When the solenoids within the casings 29 and 30 cease their action upon the valves 18 and 19, the springs 55 and 56 force the valves 18 and 19 bodily to their uppermost positions and air on the lower sides of pistons 20 and 21, respectively, opposite from that side against which compressed air is permitted to act, may be released or exhausted through parts 57 and 58, respectively, and out through openings 59 and 60.

Under normal operating conditions, the container 11 being empty at the beginning of the cycle of operation of the valve V the pointer 26 on the Toledo scale 12 will be in such a position in relation to the photo-electric cell 24 and associated apparatus that both solenoids within the casings 29 and 30 will be actuated whereby valves 18 and 19 will be pulled down to their lower-most positions and compressed air applied to the bottom sides of the pistons 20 and 21 whereby both valve elements 22 and 23 may be raised simultaneously or otherwise into the positions shown in Fig. 3, permitting liquid to flow at a relatively rapid rate from storage tank 10 through pipe 13, through valve inlet 48 and valve discharge portion or dispensing nozzle 49 into the container 11. The adjustable stop 34 plays an important part under such conditions of operation to limit the lift of the main valve 23 so that the maximum flow of fluid may be maintained through the dispensing nozzle 49 without splashing or foaming such as would require constant watch or control of the valve means. When the pointer 26 on the Toledo scale 12 reaches a predetermined point close to the absolute cut off point, the photo-electric cell 24 will be actuated in a manner to effect cessation of actuation of the solenoid within casing 30, whereby the valve 19 will be released under the action of the spring 56 from its upper position whereby compressed air may be permitted to act on the upper side of the piston 21 lowering and closing the valve element 23 to the position shown in Fig. 4. Liquid from storage tank 10 will then pass to container 11 at a relatively slow rate for the short period between the time of cessation of actuation of the solenoid within casing 30 and the time corresponding to the filling of the container 11 to the desired degree, at which time the pointer 26 on the Toledo scale 12 will then be in such position that the photo-electric cell 24 and its associated elements will cause cessation of actuation of the solenoid within casing 29, whereby the valve 18 will be forced to its upper-most position by spring 55 permitting compressed air to pass through port 53 and act upon the upper side of the piston 20, lowering and closing the valve element 22 to the position illustrated in Fig. 2, whereby the container 11 is rapidly and accurately filled to the desired degree automatically.

Under normal conditions of operation as recited, the parts of the valve apparatus are so adjusted to the quantities to be measured, the Toledo scale, and the other associated elements that smooth operation is assured without attention. However, under varying conditions of operation the same smoothness of operation may be insured while retaining the accuracy of measurement of the liquid passing through the valve with my construction by making the proper adjustment through the medium of thumb screws 33 and 34, which adjustment may then remain constant under the conditions for which the adjustment was made. Under more severe conditions, under heavy pressures, loads, liquids of high specific gravity being measured, where preciseness of operation are essential for accuracy, the photo-electric cell 24 and the pointer 26 may be so associated with each other that at the beginning of a cycle of operation, at which time the container 11 is empty, the valve element 22 may be arranged to be operated first whereby pressure upon the valve element 23 is relieved to a considerable extent and then upon the pointer reading a certain relatively small but definite quantity more than that corresponding to the empty container 11, the photoelectric cell 24 may be actuated to transmit energy to the solenoid within the casing 30 whereby the valve element 23 will be open. From then on the operation may be similar to that already described under normal conditions.

The adjusting screw 33 serves a dual function, the first has already been described as limiting the amount of opening of the small valve element 22. The second function of the screw 33 involves the complete shutting down of the entire valve structure when the screw is turned to engage the top of the piston 20, and the valve element 22 is on its seat 47 within valve element 23 and valve element 23 is on its seat 46.

From the above it will be clear that applicant has devised a simple, compact, unitary valve construction which is capable of rapid and accurate operation under varying load and under varying fluid to be measured characteristic conditions.

It will be obvious to those skilled in the art that various changes may be made in this device without departing from the spirit of the invention and therefor the invention is not limited to what is shown in the drawing and described in the specification but only as indicated in the appended claims.

I claim:

1. A valve structure comprising a relatively large valve element comprising a relatively small valve seat, a relatively small valve element associated with said seat, motive means associated with each of said valve elements comprising a piston and fluid pressure means, means for controlling said fluid pressure means in a manner whereby closure of said relatively large valve element is effected first and closure of said relatively small valve element is effected second.

2. The structure recited in claim 1, and means for adjusting the amount of opening for one of said valves.

3. The structure recited in claim 1, and means for controlling the amount of opening of each of said valves.

4. A valve structure comprising a valve seat, a valve element associated with said seat, means for effecting movement of said valve element, means for limiting the movement of said valve element comprising an adjustment screw, a second valve element, a stem associated with said second valve element, piston and cylinder means for effecting movement of said second valve element, a packing gland associated with said piston and cylinder means, a packing screw associated with said packing gland, said adjustment screw and said packing screw being so associated with each other whereby said packing screw acts as a stop, limiting the movement of said first valve element in accordance with the position of said adjustment screw.

5. A dispensing nozzle having a discharge orifice therein, a pair of concentrically mounted valves cooperating with said orifice, the outer of said pair of valves being of materially greater diameter than the inner and a pair of concentrically mounted fluid operated pistons each having means operatively connected to one of said valves, said last named means comprising a pair of valve stems telescopically associated with each other, fluid pressure means associated with both sides of each piston, and means controlling the fluid pressure means of each piston in a manner to effect closure of the outer large valve first and the inner small valve second.

6. A dispensing device having a discharge orifice therein, an outer large diameter valve and an inner small diameter valve cooperating with said orifice, a pair of fluid operated pistons each having means operatively connected to one of said valves, said last named means comprising a pair of valve stems telescopically associated with each other, two fluid pressure operated means one associated with each of said pistons for positive operation thereof in both directions, and means controlling each of said fluid pressure means to effect closure of the outer large diameter valve first and the inner small diameter valve second.

TRAVIS W. WINBERG.